US012589351B2

(12) United States Patent　　　　　(10) Patent No.:　US 12,589,351 B2

Gill et al.　　　　　　　　　　　　　　(45) Date of Patent:　Mar. 31, 2026

(54) MOBILE REFRIGERATION UNIT

(71) Applicant: VoltaGrid LLC, Bellaire, TX (US)

(72) Inventors: Tejinder Singh Gill, Calgary (CA);
Leslie Michael Wise, Houston, TX
(US); Nathan Ough, Bellaire, TX (US)

(73) Assignee: VOLTAGRID LLC, Houston, TX (US)

( * ) Notice:　Subject to any disclaimer, the term of this
patent is extended or adjusted under 35
U.S.C. 154(b) by 1012 days.

(21) Appl. No.: 17/679,776

(22) Filed:　　Feb. 24, 2022

(65)　　　　Prior Publication Data

US 2022/0266194 A1　　Aug. 25, 2022

Related U.S. Application Data

(60) Provisional application No. 63/153,067, filed on Feb.
24, 2021.

(51) Int. Cl.
B01D 53/26　　　(2006.01)
B01D 53/00　　　(2006.01)
B01D 53/28　　　(2006.01)
C10L 3/10　　　(2006.01)

(52) U.S. Cl.
CPC ......... B01D 53/263 (2013.01); B01D 53/002
(2013.01); B01D 53/28 (2013.01); C10L 3/106
(2013.01); *B01D 2252/2023* (2013.01); *C10L*
*2290/141* (2013.01)

(58) Field of Classification Search
None
See application file for complete search history.

(56)　　　　References Cited

U.S. PATENT DOCUMENTS

| | | | | |
|---|---|---|---|---|
| 4,505,127 A | * | 3/1985 | Pronovost | F17C 5/06 |
| | | | | 62/271 |
| 4,588,424 A | * | 5/1986 | Heath | B01D 53/263 |
| | | | | 417/404 |
| 4,701,188 A | * | 10/1987 | Mims | C07C 7/09 |
| | | | | 95/209 |

(Continued)

FOREIGN PATENT DOCUMENTS

| | | | | |
|---|---|---|---|---|
| AU | 2014281829 A1 * | 7/2015 | | G05B 15/02 |
| CA | 2814402 A1 * | 4/2012 | | C10L 31/106 |

(Continued)

*Primary Examiner* — Brit E. Anbacht

(74) *Attorney, Agent, or Firm* — Morgan, Lewis &
Bockius LLP

(57)　　　　ABSTRACT

In one embodiment, a gas conditioning system includes a
trailer chassis, an inlet valve, a chiller, a separator, a system
outlet, and a dehydration agent injection system. The inlet
valve may be coupled to the trailer chassis and may be
configured to direct flow to a fluid conduit. The chiller may
be in thermal communication with the fluid conduit and is
configured to remove heat from the flow within the fluid
conduit The separator may be coupled to the trailer chassis
and define a separator inlet to receive flow from the fluid
conduit. The separator may be configured to direct condi-
tioned gas from the separator inlet to a first separator outlet.
The system outlet may be configured to receive flow from
the first separator outlet. The dehydration agent injection
system includes an injector, a dehydration agent, and a
reboiler.

22 Claims, 3 Drawing Sheets

(56) References Cited

U.S. PATENT DOCUMENTS

| | | | | |
|---|---|---|---|---|
| 7,132,008 | B2 * | 11/2006 | Wijmans | B01D 53/263 |
| | | | | 96/240 |
| 8,899,557 | B2 * | 12/2014 | Cullinane | B01D 3/14 |
| | | | | 261/76 |
| 10,591,184 | B2 | 3/2020 | La Porte | |
| 10,862,307 | B2 | 12/2020 | Cavness et al. | |
| 10,862,309 | B2 | 12/2020 | Cavness et al. | |
| 11,549,351 | B1 | 1/2023 | Fournier | |
| 11,674,484 | B2 | 6/2023 | Oehring | |
| 11,686,188 | B1 | 6/2023 | Fournier | |
| 12,078,110 | B2 | 9/2024 | Oehring et al. | |
| 2008/0041228 | A1 * | 2/2008 | Seibert | B01D 53/263 |
| | | | | 95/166 |
| 2016/0130516 | A1 * | 5/2016 | Edlund | C10L 3/101 |
| | | | | 48/127.9 |
| 2016/0138838 | A1 * | 5/2016 | Simross | F04B 49/007 |
| | | | | 62/335 |

| | | | | |
|---|---|---|---|---|
| 2020/0232675 | A1 | 7/2020 | La Porte | |
| 2020/0355427 | A1 * | 11/2020 | Woodward | C10L 3/107 |
| 2022/0126251 | A1 * | 4/2022 | Stevenson | C01C 1/02 |
| 2022/0146194 | A1 * | 5/2022 | Mealey | F25J 3/0242 |
| 2022/0266194 | A1 * | 8/2022 | Gill | C10L 3/101 |
| 2023/0018992 | A1 | 1/2023 | Hinderliter et al. | |
| 2025/0002338 | A1 * | 1/2025 | Davis | C01B 3/382 |

FOREIGN PATENT DOCUMENTS

| | | | | |
|---|---|---|---|---|
| CA | 2851304 | | 1/2016 | |
| CA | 3073036 | A1 * | 2/2019 | B01D 53/1443 |
| CA | 2911852 | | 9/2021 | |
| EP | 1372824 | B1 * | 8/2004 | B01D 17/0202 |
| EP | 3938470 | B1 * | 10/2024 | C10L 3/107 |
| WO | 2014197969 | | 12/2014 | |
| WO | 2023141085 | | 7/2023 | |

* cited by examiner

100

144

116

150

124

151

MOBILE REFRIGERATION UNIT

REFERENCE TO RELATED APPLICATIONS

This application claims priority to U.S. Provisional Application No. 63/153,067, filed Feb. 24, 2021, the entire disclosure of which is incorporated herein by this reference.

TECHNICAL FIELD

The present disclosure relates generally to natural gas conditioning, and more particularly, to natural gas refrigeration and methods of operation thereof.

BACKGROUND

Natural gas is found in hydrocarbon reservoirs such as coal beds or underground rock formations. In oil production, natural gas (or field gas) is often a byproduct of oil production at wellsites. While often times the gas is flared off, natural gas can be captured and used as a fuel source.

In some applications, it is desired to use field gas directly as a fuel source. However, field gas cannot typically be used directly from the wellsite as a fuel source because the composition of the field gas can drastically vary. For example, field gas can have a high water content (wet gas), a low water content (dry gas), a high hydrocarbon content (rich gas) and/or a low hydrocarbon content (lean gas). The produced field gas can have any number of compositions, such as: wet and rich, dry and lean, wet and lean, or dry and rich. This wide variety in gas quality and content can affect the heating value of the natural gas.

The varying heat value of the natural gas can prevent the use of field gas as a reliable or high-quality fuel source for reciprocating engines. For example, while rich gas can be used in reciprocating engines, the engine typically runs at a lower performance envelope, with higher emissions, and is more prone to component failure.

Therefore, in some applications, it is desirable to condition field gas prior to use as a fuel source. In some applications, a refrigeration unit can be used as a gas conditioning system that separates certain hydrocarbon constituents out of a natural gas blend. The refrigeration unit cools the natural gas, which allows certain heavier hydrocarbons to condense and form a liquid stream. During the refrigeration process, the field gas can be dehydrated to condition gas into a consumable form for reciprocating engines. However, certain conventional refrigeration units can be bulky and difficult to transport. Therefore, conditioning field gas with certain conventional refrigeration units can be uneconomical.

In addition to varying in content as discussed above, the production of field gas may also vary in volume. For example, the production of field gas may vary from no volume to high volumes of gas. Conventional gas conditioning systems may not be able to adjust operation of the conditioning system in response to the variation in volume of field gas. Further, conventional gas conditioning systems may not be able to provide processed field gas at a high enough throughput to support the demand of downstream devices or vary the output of processed field gas to support transient demands of downstream devices. Finally, certain conventional gas conditioning systems, such as conventional mobile gas conditioning systems may inject methanol as the dehydrating agent into the field gas. This can result in methanol left in the conditioned gas which may alter performance or damage downstream devices. In some applications, additional treatment of the gas can be utilized to remove injected methanol, which can be uneconomical.

Therefore, what is needed is a gas conditioning system or method that addresses one or more of the foregoing issues, among one or more other issues.

SUMMARY

In one embodiment, a gas conditioning system may include a trailer chassis, an inlet valve, a chiller, a separator, a system outlet, and a dehydration agent injection system. The inlet valve may be coupled to the trailer chassis and may be configured to direct flow to a fluid conduit. The chiller may be cooled by an electrically driven propane refrigeration loop and coupled to the trailer chassis. The chiller may be in thermal communication with the fluid conduit and is configured to remove heat from the flow within the fluid conduit. The separator may be coupled to the trailer chassis and define a separator inlet to receive flow from the fluid conduit. The separator may be configured to direct conditioned gas from the flow to a first separator outlet. The system outlet may be configured to receive flow from the first separator outlet. The dehydration agent injection system may comprise an injector, a dehydration agent, and a reboiler. The injector may be configured to inject a dehydration agent into the flow. The separator may be configured to direct the dehydration agent from the flow to a second separator outlet. The reboiler may be coupled to the trailer chassis and configured to receive flow from the second separator outlet. The reboiler may comprise an electric heating unit, wherein the electric heating unit is configured to transfer heat to the dehydration agent disposed within the reboiler.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The present disclosure relates generally to gas conditioning systems, and more particularly, to gas conditioning systems and methods of operations thereof. As described herein, embodiments of the gas conditioning system, chiller, dehydration agent injection system, and methods of use thereof described herein address the issues described with respect to traditional gas conditioning configurations.

Certain conventional gas conditioning systems can be large or bulky, may require multiple conditioning processes, and may be powered by various fuel sources. During operation, certain conventional gas conditioning systems may not be able to adapt to varying flow rates and/or cooling demands. Further, certain conventional gas conditioning systems may not be able to provide a desired throughput, and/or may not be able to provide a desired fuel quality. As a result, conventional gas conditioning systems may be hard to transport, require additional fuel/support for operation, may not provide a desired throughput, may necessitate the need for additional gas treatment, or may reduce performance of downstream devices (e.g. generators).

As described herein, embodiments of the gas conditioning system can include components that are mounted on a trailer to allow for portability and ease of transport. Further embodiments of the gas conditioning system can include components, such as a reboiler that is powered by electricity to allow for flexible operation and layout. Certain embodiments of the gas conditioning system can include a dehydration agent regeneration system to allow for the removal of hydrates from the field gas while preventing degradation of the field gas and/or avoiding further processing of the field gas. Further, certain embodiments of the gas conditioning system can include a control system to vary the flow and chilling capacity of the gas conditioning system based on operating conditions.

Figure 1:
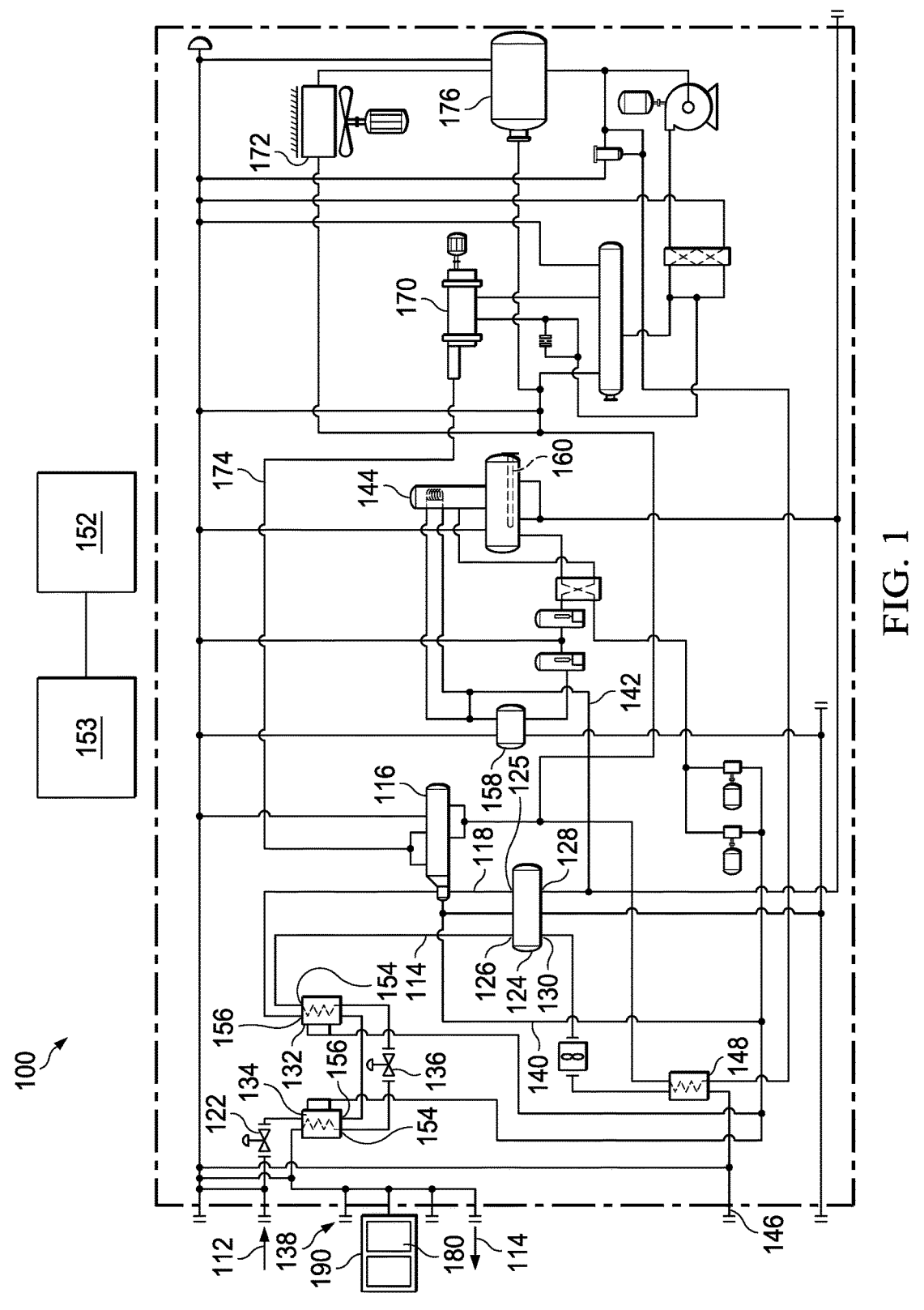
FIG. 1 is a schematic diagram of a gas conditioning system, in accordance with embodiments of the present disclosure.
Figure 2:
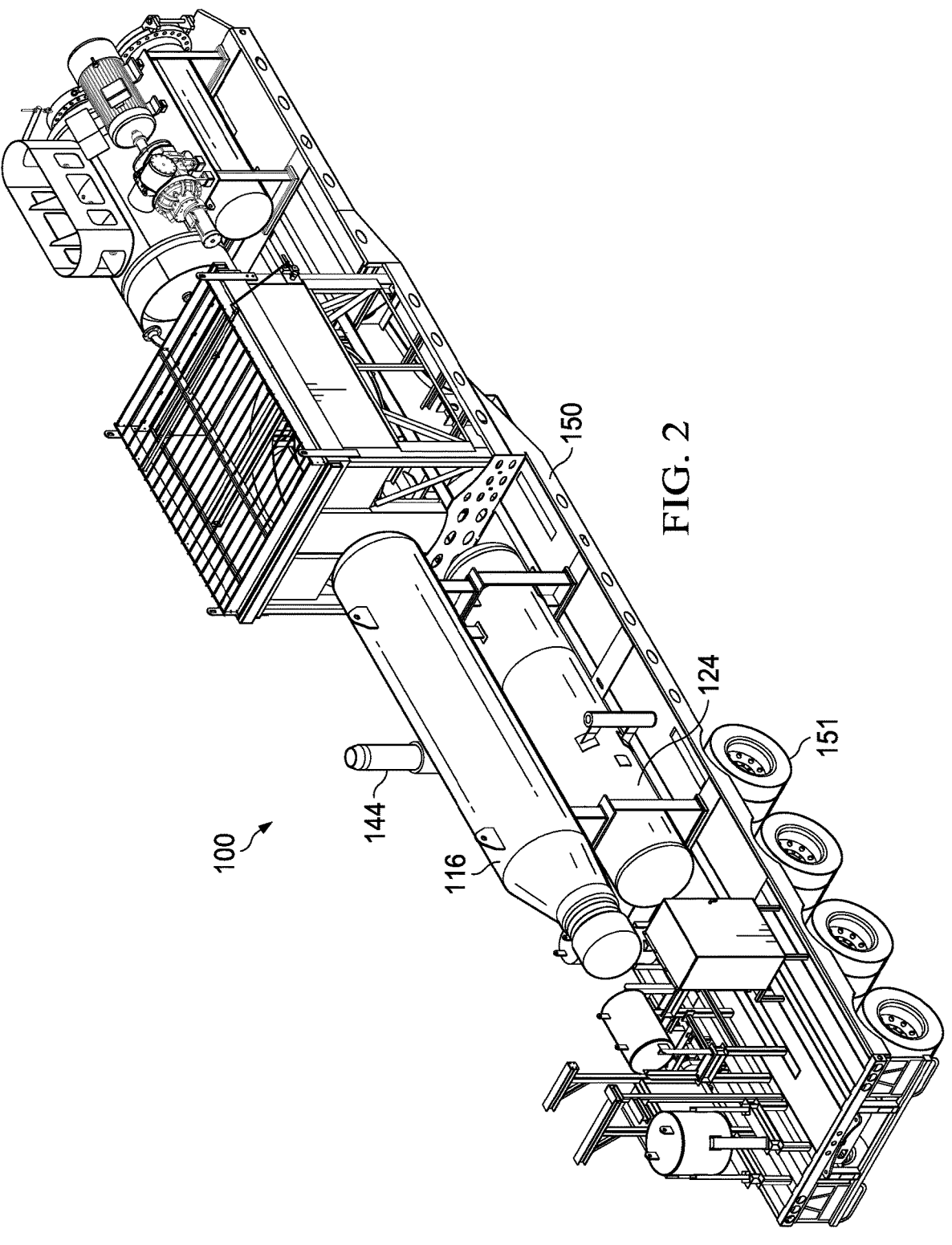
FIG. 2 is a perspective view of the gas conditioning system, in accordance with embodiments of the present disclosure.
Figure 3:
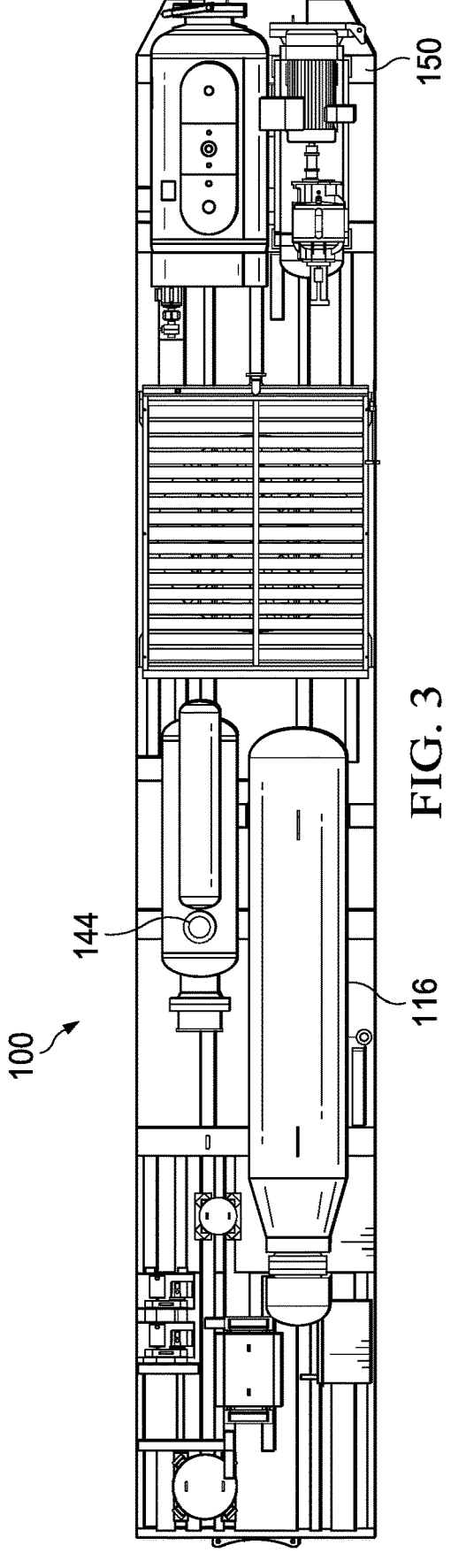
FIG. 3 is a top view of the gas conditioning system, in accordance with embodiments of the present disclosure.

FIG. 1 is a diagram of a gas conditioning system 100, in accordance with embodiments of the present disclosure. FIG. 2 is a perspective view of the gas conditioning system 100, in accordance with embodiments of the present disclosure. FIG. 3 is a top view of the gas conditioning system 100, in accordance with embodiments of the present disclosure. With reference to FIGS. 1-3, the gas conditioning system 100 can condition a field gas 112 to a conditioned gas 114 suitable for use in downstream devices, such as reciprocating engine generators. As described herein, components of the gas conditioning system 100 can be mounted to a single common trailer platform or chassis 150 to allow the gas conditioning system 100 to be transported to various locations, such as wellsites or other locations where gas conditioning is required. The trailer chassis 150 can include wheels 151 to allow the gas conditioning system 100 to be transported by a tractor-trailer. Advantageously, the components of the gas conditioning system 100 disposed on the trailer chassis 150 comply with the dimensions and weight requirements of a legal sized shipping load allowing for transport via any suitable means, such as on-the-road transport, etc. The trailer chassis 150 and the gas conditioning system 100 can be transported by any other suitable method of transportation. Further, the gas conditioning system 100 can be powered by electricity to allow for mobility and/or flexibility of the system. The gas conditioning system 100 can be powered by a generator. Optionally, the gas conditioning system 100 can be powered by a utility power source.

In the depicted example, the gas conditioning system 100 can receive field gas 112 from a pipeline containing gas from one or more wellsites. As illustrated, the gas conditioning system 100 includes an inlet valve 122 that receives a flow of field gas 112 from a pipeline, wellsite, or other suitable source. The inlet valve 122 regulates the flow and pressure of field gas 112 into the gas conditioning system 100. In some embodiments, the inlet valve 122 includes a proportional valve to control the flow and pressure of the field gas 112 into the gas conditioning system 100. For example, a proportional valve can selectively permit and restrict flow into the gas conditioning system 100. By controlling the flow and pressure of the field gas 112, the inlet valve 122 can control the amount of field gas 112 that is delivered to the components of the gas conditioning system 100 and/or the amount of conditioned gas that is output by the gas conditioning system 100. In some embodiments, the inlet valve 122 is coupled to a trailer chassis 150.

Gas introduced into the gas conditioning system 100 can be chilled and condensed during the conditioning process. In the depicted example, the gas conditioning system 100 includes a chiller 116 that removes heat from the flow of field gas 112. As the field gas 112 cools, a portion of the field gas 112 can condense to a liquid stream 118 including natural gas liquids such as propane, butane, and pentane.

As described herein, the chiller 116 is cooled by a propane refrigeration loop. Further the chiller 116 is selected or sized to have a capacity suitable for an anticipated field gas flow 112 and/or a desired throughput of conditioned field gas 114. In the depicted example, the gas conditioning system 100 can include an enlarged capacity chiller 116 to allow for a high throughput of conditioned field gas 114. In some applications, the gas conditioning system 100 can omit certain components to allow for the inclusion of larger, more robust, or higher capacity components for increased throughput. Advantageously, by omitting certain components, other components can be enlarged while still allowing for the gas conditioning system 100 to be transported by a single trailer chassis 150. For example, in some embodiments, the gas conditioning system 100 does not require or include a compressor, allowing for the chiller 116 (or other components) to have an enlarged capacity and allow for a high throughput of conditioned field gas 114. As described herein, the chiller 116 is operated by a control system 152. The control system 152 can manipulate operation and cooling capacity of the chiller 116 in response to operational and user parameters.

In the depicted example, the chiller 116 is coupled to a trailer chassis 150. In some embodiments, the chiller 116 is coupled to the same trailer chassis 150 as the rest of the components of the gas conditioning system 100.

The chilled field gas can be separated into conditioned gas 114 and natural gas liquids 146 with the use of a separator 124. In the depicted example, the chiller 116 directs the chilled field gas 118 into a separator inlet 125 of the separator 124. The separator 124 can isolate and direct the conditioned gas 114 to a separator outlet 126. Further, the separator 124 isolates and directs the natural gas liquids (NGL) 146 to a separator outlet 130. In some embodiments, the natural gas liquids 146 can pass through a heat exchanger 148 before exiting the gas conditioning system 100. Optionally, the natural gas liquids 146 are directed from the heat exchanger 148 to a NGL storage device. The NGL storage device can be certified for certain applications. As described herein, the separator 124 is coupled to a trailer chassis 150.

In the depicted example, the conditioned gas 114 from the separator 124 is warmed by heat exchangers 132 and 134 prior to delivery to a downstream device. As illustrated, conditioned gas 114 is directed from the separator outlet 126 through the heat exchanger 132. In some embodiments, the conditioned gas 114 is directed from the separator outlet 126, through a passage 154 of the heat exchanger 132, and toward the system outlet 138 (optionally via the second heat exchanger 134). The conditioned gas 114 passing through the passage 154 is heated by the field gas 112 in counter-flow through a passage 156 of the heat exchanger 132 and in thermal communication with the conditioned gas 114. The field gas 112 is directed from the inlet valve 122, through the passage 156, and toward the chiller 116. The field gas 112 can optionally be directed from the second heat exchanger 134. Similarly, the field gas 112 passing through the heat exchanger 132 is pre-cooled by the conditioned gas 114 prior to entering the chiller 116.

Optionally, the conditioned gas 114 passing through the heat exchanger 132 can also be warmed by a second heat exchanger 134. As illustrated, warmed conditioned gas 114 exiting the heat exchanger 132 can be directed through the second heat exchanger 134. In some embodiments, the conditioned gas 114 is directed from the passage 154 of the first heat exchanger 132, through a passage 154 of the second heat exchanger 134, and toward the system outlet 138. The conditioned gas 114 passing through the passage 154 of the heat exchanger 134 is heated by the field gas 112 in counter-flow through a passage 156 of the heat exchanger 134 and in thermal communication with the conditioned gas 114. The field gas 112 is directed from the inlet valve 122, through the passage 156 of the second heat exchanger 134, and toward the passage 156 of the first heat exchanger 132. Similarly, the field gas 112 passing through the heat exchanger 134 is pre-cooled by the conditioned gas 114 prior to entering the chiller 116 via the heat exchanger 132.

In some embodiments, a pressure control valve 136 can control the flow of conditioned gas 114 between the heat exchangers 132 and 134. As a result, the pressure control valve 136 can also indirectly control the flow from the separator 124 to the system outlet 138.

As illustrated, conditioned gas 114 from the separator 124 (or optionally the heat exchangers 132 and 134) can be directed to a downstream device via one or more system outlets 138. In some embodiments, the conditioned gas 114 is directed to four separate system outlets 138. In some embodiments, the system outlet 138 can be in fluid communication with a reciprocating engine, acting as a fuel source to deliver conditioned gas 114 to the reciprocating engine. In some applications, the reciprocating engine is the power source of a generator 180. In some embodiments, the gas conditioning system 100 can provide conditioned gas to one or more generators 180 that are in a microgrid configuration 190, as described in U.S. patent application Ser. No. 17/575,194, filed Jan. 13, 2022, the entire disclosure of this application being incorporated herein by this reference.

In some applications, the flow of conditioned gas 114 through the system outlet 138 can be controlled by a variable speed drive to control the output flowrate of conditioned gas 114 through the system outlet 138. Optionally, the flow of natural gas liquids 146 out of the gas conditioning system 100 can also be controlled by the variable speed drive. Further, the variable speed drive can accommodate the fluctuating flow of field gas 112 coming into the gas conditioning system 100. In some embodiments, the gas conditioning system 100 can bypass the inlet valve 122 and system outlet 138, allowing the gas conditioning system 100 to recirculate and continue to run.

In some embodiments, the gas conditioning system can introduce a dehydration agent into the field gas 112 to prevent the formation of hydrates. As illustrated, an injector 140 injects a dehydrating agent into the flow of the field gas 112. In some embodiments, the injector 140 injects the dehydrating agent into the flow of the field gas 112 prior to entering the chiller 116. In other embodiments, the injector 140 can be disposed to inject the dehydrating agent into the flow of the field gas 112 prior to entering one or more heat exchangers of the gas conditioning system 100, including, but not limited to the heat exchangers 132, 134, and 148. In some embodiments, the gas conditioning system 100 can include multiple injectors 140 to inject the dehydrating agent at various positions and stages of flow of the gas conditioning system 100.

In some embodiments, the dehydrating agent is glycol. As described herein, the use of glycol is advantageous as a dehydrating agent because it dehydrates the field gas and can be later removed or separated from the conditioned gas 114 without leaving byproduct in the conditioned gas 114 that would result in contamination or an unacceptable heat value for reciprocating engines. In contrast, certain conventional gas conditioning systems use methanol, which can remain in a conditioned gas without additional processing. The presence of methanol in a conditioned gas can result in a heat value that is not suitable for a reciprocating engine and could result in poor performance and an increase in emissions.

In addition to separating the conditioned gas 114 from the natural gas liquids 146 in the field gas 112, the separator 124 can remove the dehydrating agent from the field gas 112. In the depicted example, the separator 124 separates the now hydrated-dehydration agent 142 from the conditioned gas 114 and directs the hydrated-dehydration agent 142 to a separator outlet 128.

As illustrated, the hydrated-dehydration agent 142 is directed from the separator 124 to a reboiler 144 to regenerate the dehydration agent 142. The reboiler 144 transfers heat to the hydrated-dehydration agent 142 to vaporize or remove water from the dehydration agent 142. In the depicted example, the reboiler 144 is heated by an electric heating unit 160.

During operation, the injector 140 can receive and inject the regenerated dehydration agent 142 from the reboiler 144. Advantageously, this allows for the dehydration agent 142 to be recirculated and reused in the gas conditioning process without requiring the consumption of a dehydration agent, such as methanol. In some embodiments, dehydration agent 142 from the reboiler 144 is directed to a storage tank. Optionally, the dehydration agent 142 from the reboiler 144 is directed to a flash vessel 158 for further processing of the dehydration agent 142. In some embodiments, process fluids, such as the dehydration agent 142 are stored in storage vessels on the trailer chassis 150. The storage vessels can be DOT compliant to avoid off-loading of process fluids prior to mobilization of the gas conditioning system 100.

As mentioned above, the chiller 116 can be cooled by a propane refrigeration loop. In some embodiments, the propane refrigeration loop includes a compressor 170, a condenser 172, a heat exchanger 148, and the chiller 116. During operation, low pressure, high temperature propane 174 from the chiller 116 is directed to a compressor 170. The compressor 170 compresses the propane 174 to a high pressure, high temperature gas. The compressor 170 then directs the propane 174 to a condenser 172, which cools the propane 174 into a saturated, high pressure, low temperature liquid. In some embodiments, the liquid propane 174 from the condenser 172 can be stored in an accumulator 176. Advantageously, accumulator 176 can be DOT compliant to avoid off-loading of propane 174 prior to mobilization of the gas conditioning system 100. From the accumulator 176, the propane 174 can pass through a heat exchanger 148 to subcool the propane 174 prior to use in the chiller 116. As illustrated, the propane 174 passing through the heat exchanger 148 is subcooled by the natural gas liquids 146 in counterflow through the heat exchanger 148 and in thermal communication with the propane 174. Prior to entering the chiller 116, the propane 174 can be flashed to reduce the pressure of the propane 174 (hence subcooling the propane 174). After subcooling, the low temperature, low pressure propane 174 can absorb heat from the chiller 116, cooling the field gas 112. During operation, the low pressure, high temperature gas propane 174 from the chiller is directed back to the compressor 170. In some embodiments, the components of the propane refrigeration loop can be powered by electricity.

In some embodiments, one or more aspects of the operation of the gas conditioning system 100 are controlled with a control system 152. The control system 152 can contain a non-transitory machine readable storage medium containing executable instructions which are executed by a data processing system to operate aspects of the gas conditioning system 100. During operation, the control system 100 can monitor parameters (e.g., fluid temperature, fluid pressure, fluid flow rate, reboiler temperature, chiller temperature) of the gas conditioning system 100. In some embodiments, the control system 152 includes a gas analysis system 153 to analyze the quality of gas through the gas conditioning system 100. In some applications, the control system 152 can be monitored or operated locally or remotely.

In some applications, the control system 152 can control one or more components of the gas conditioning system 100 in response to one or more of the monitored parameters and/or user input. For example, the control system 152 can control operation of the inlet valve 122, the chiller 116, or the reboiler 144 in response to system parameters. In some embodiments, the gas analysis system 153 can instruct an operator to modify operation of the gas conditioning system 100 in response to gas quality parameters to ensure that the conditioned gas 114 meets certain thresholds. For example, if the gas analysis system 153 analyzes the conditioned gas 114 and detects that the conditioned gas 114 has a high hydrocarbon content (e.g. too rich), the gas analysis system 153 can alert the operator to this condition, enabling the operator to review operating parameters, troubleshoot, and/or shutdown the gas conditioning system 100. In some applications, information from the gas analysis system 153 can be used to tune operation of downstream devices, such as generators 180, engines, etc., based on the composition of the conditioned gas 114.

With reference to FIGS. 2 and 3, the components of the gas conditioning system 100 are positioned and balanced to fit on the trailer chassis 150. As illustrated, the components of the gas conditioning system 100 are vertically stackable to maximize packaging efficiency and to minimize the width of the gas conditioning system 100. For example, the chiller 116 is disposed above the separator 124, minimizing the horizontal envelope of the gas conditioning system 100 while also reducing the amount of piping needed between the components. As illustrated, the reboiler 144 is positioned adjacent to the chiller 116 on the trailer chassis 150.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A gas conditioning system, comprising:
   a trailer chassis;
   an inlet valve coupled to the trailer chassis, wherein the inlet valve is configured to direct flow to a fluid conduit;
   a chiller coupled to the trailer chassis, wherein the chiller is in thermal communication with the fluid conduit and is configured to remove heat from the flow within the fluid conduit;
   a separator coupled to the trailer chassis and defining a separator inlet to receive flow from the fluid conduit, wherein the separator is configured to direct conditioned gas from the separator inlet to a first separator outlet;
   a system outlet configured to receive flow from the first separator outlet; and
   a dehydration agent injection system, comprising:
      an injector configured to inject a dehydration agent into the flow, wherein the separator is configured to direct the dehydration agent from the flow to a second separator outlet; and
      a reboiler coupled to the trailer chassis and configured to receive flow from the second separator outlet, the reboiler comprising an electric heating unit, wherein the electric heating unit is configured to transfer heat to the dehydration agent disposed within the reboiler.

2. The gas conditioning system of claim 1, wherein the inlet valve comprises a proportional valve, wherein the proportional valve is movable to control the flow into the fluid conduit.

3. The gas conditioning system of claim 1, wherein the system outlet is configured to direct flow to a generator.

4. The gas conditioning system of claim 1, wherein the reboiler is configured to direct the dehydration agent from the reboiler to the injector.

5. The gas conditioning system of claim 1, wherein the dehydration agent is glycol.

6. The gas conditioning system of claim 1, further comprising a first heat exchanger defining a first flow path and a second flow path, wherein the first flow path directs flow from the inlet valve toward the chiller, the second flow path directs flow from the first separator outlet toward the system outlet, and the first flow path is in thermal communication with the second flow path.

7. The gas conditioning system of claim 6, further comprising a second heat exchanger defining a third flow path and a fourth flow path, wherein the third flow path directs flow from the inlet valve toward the first flow path of the first heat exchanger, the fourth flow path directs flow from the second flow path of the first heat exchanger toward the system outlet, and the third flow path is in thermal communication with the fourth flow path.

8. The gas conditioning system of claim 7, further comprising a pressure control valve disposed between the fourth flow path of the second heat exchanger and the second flow path of the first heat exchanger.

9. The gas conditioning system of claim 1, further comprising:

a control system comprising a data processing system; and a non-transitory machine readable storage medium stored on the control system and containing executable instructions which when executed by the data processing system cause the data processing system to perform a method, the method comprising:

obtaining one or more parameters of the gas conditioning system; and controlling operation of at least one of the inlet valve, the chiller, and the reboiler in response to the one or more parameters.

10. The gas conditioning system of claim 9, wherein the one or more parameters comprise a fluid flow rate, a fluid pressure, a chiller temperature, or a reboiler temperature.

11. The system of claim 1, wherein the system does not include a natural gas compressor.

12. The system of claim 1, wherein the chiller is disposed vertically above the separator in relation to the trailer chassis.

13. A field gas power generation system, comprising:

a gas conditioning system, comprising:

an inlet valve configured to direct flow to a fluid conduit;

a chiller wherein the chiller is in thermal communication with the fluid conduit and is configured to remove heat from the flow within the fluid conduit;

a separator defining a separator inlet to receive flow from the fluid conduit, wherein the separator is configured to direct conditioned gas from the separator inlet to a first separator outlet;

a system outlet configured to receive flow from the first separator outlet; and a dehydration agent injection system, comprising:

an injector configured to inject a dehydration agent into the flow, wherein the separator is configured to direct the dehydration agent from the flow to a second separator outlet; and a reboiler configured to receive flow from the second separator outlet, the reboiler comprising an electric heating unit, wherein the electric heating unit is configured to transfer heat to the dehydration agent disposed within the reboiler; and a generator configured to receive flow from the system outlet, wherein the generator is configured to generate electricity from the flow from the system outlet.

14. The field gas power generation system of claim 13, wherein the chiller and the electric heating unit are powered by the generator.

15. The field gas power generation system of claim 13, wherein the inlet valve is configured to receive flow from a pipeline.

16. A method of operating a gas conditioning system, the method comprising:

transporting the gas conditioning system relative to a fluid source, wherein the gas conditioning system comprises a chiller, a separator, and a reboiler;

directing a flow from the fluid source to the chiller;

injecting a dehydration agent into the flow;

removing heat from the flow with the chiller;

separating a conditioned gas from the flow from the chiller via the separator;

separating the dehydration agent from the flow via the separator;

directing the conditioned gas to a downstream device via an outlet;

directing the dehydration agent from the separator to the reboiler; and electrically heating the dehydration agent via an electric heating unit of the reboiler.

17. The method of claim 16, wherein the fluid source comprises a pipeline.

18. The method of claim 16, further comprising:

directing the conditioned gas to a generator.

19. The method of claim 18, further comprising:

providing electricity to a microgrid via the generator.

20. The method of claim 16, further comprising:

transporting the gas conditioning system via a trailer.

21. The method of claim 16, further comprising:

controlling a fluid flow rate, a fluid pressure, a chiller temperature, or a reboiler temperature.

22. The method of claim 16, further comprising:

transferring heat from the flow entering the chiller to the conditioned gas directed to the downstream device.

* * * * *